April 10, 1928.  1,665,312
L. A. LAURSEN
METHOD OF AND APPARATUS FOR VULCANIZING RUBBER ARTICLES
Filed April 29, 1926  2 Sheets-Sheet 2
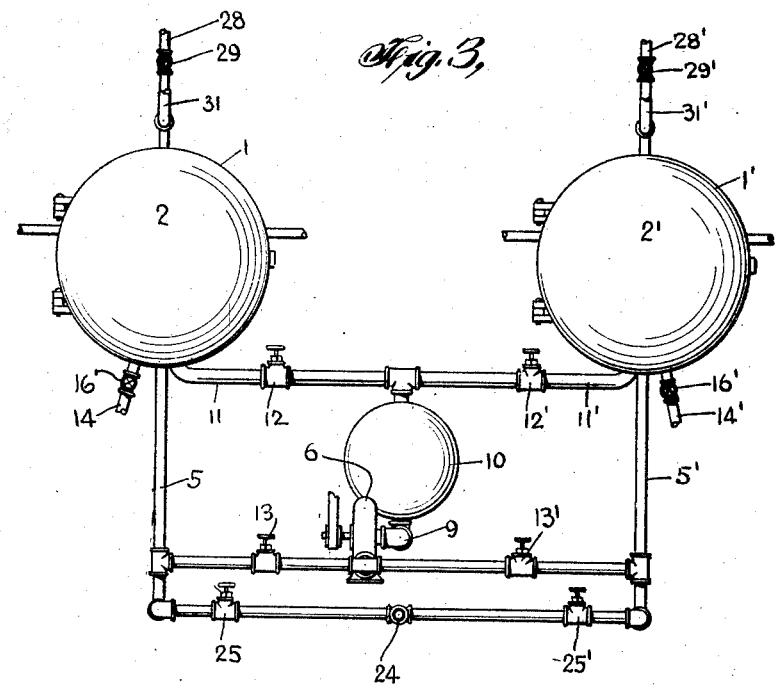
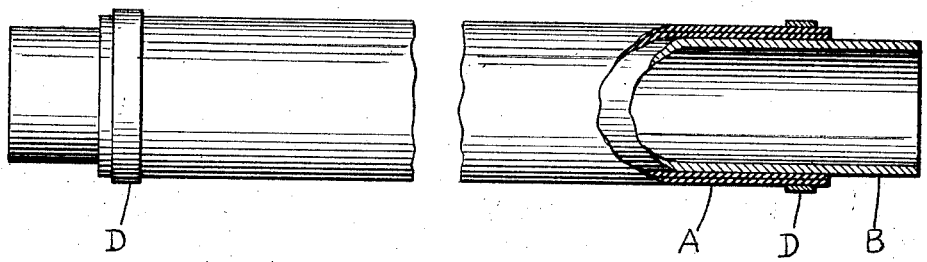
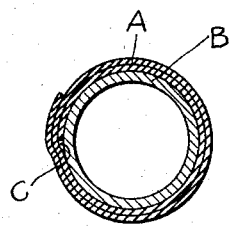

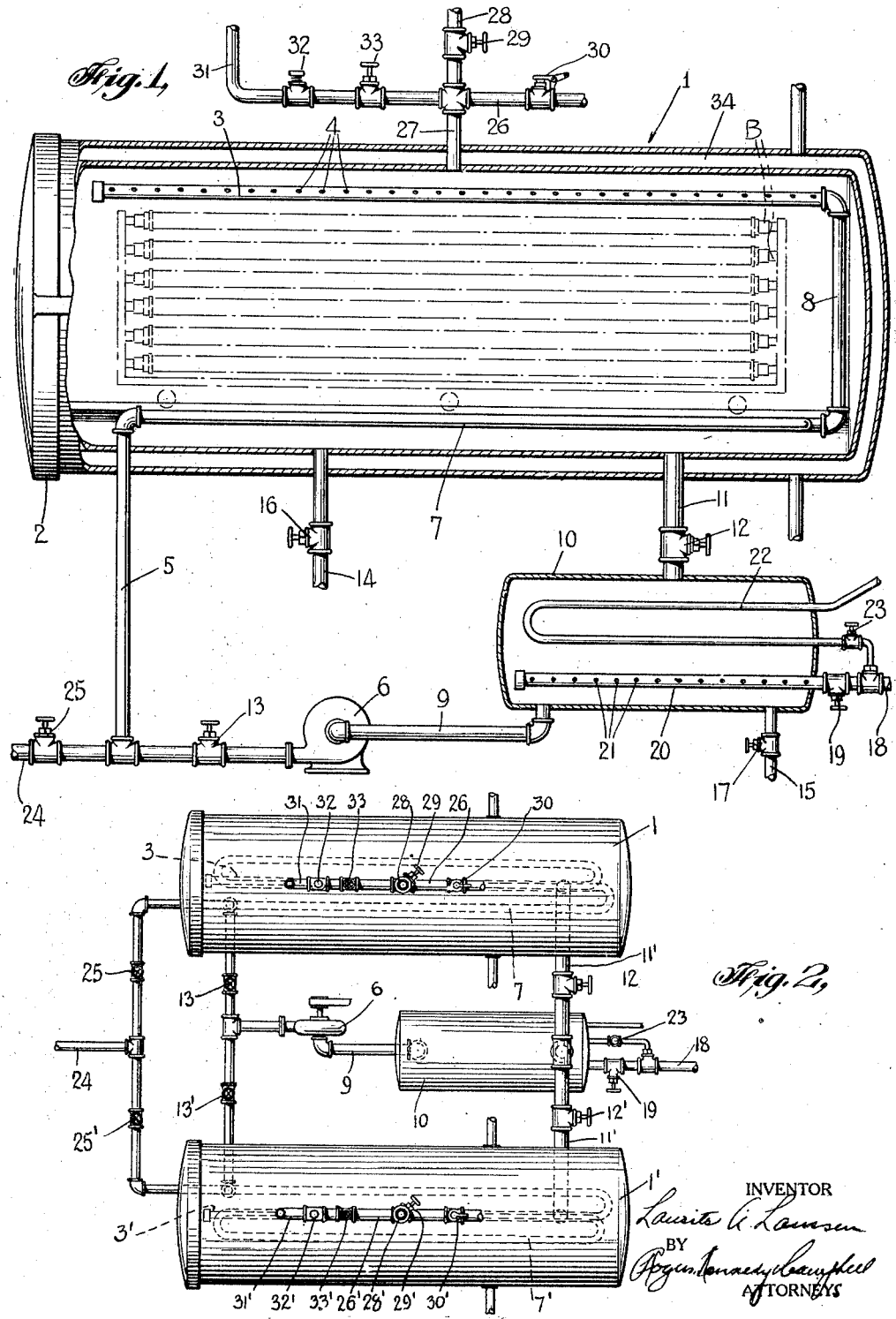

Patented Apr. 10, 1928.

1,665,312

UNITED STATES PATENT OFFICE.

LAURITS A. LAURSEN, OF AKRON, OHIO, ASSIGNOR OF ONE-FOURTH TO PEARL FISHER LAURSEN, OF AKRON, OHIO.

METHOD OF AND APPARATUS FOR VULCANIZING RUBBER ARTICLES.

Application filed April 29, 1926. Serial No. 105,367.

In my copending applications Serial Numbers 624,977, 683,096, 740,308 and 2,904, filed March 14, 1923; December 28, 1923; September 27, 1924; and January 16, 1925, respectively, I have disclosed a new process of vulcanizing rubber articles in water, such process being described with particular reference to rubber tubes for vehicle tires. The purposes and advantages of such water curing process are fully set forth in those applications and need not be repeated herein.

The present invention is likewise directed to a water curing process and contemplates the use of a minimum quantity of water and heat in carrying out the vulcanizing operations. According to the present process, I place the articles to be vulcanized in a suitable vulcanizing receptacle, and then effect the desired vulcanization of the articles by spraying them continuously with water, or a similar liquid, heated to and maintained at the desired vulcanizing temperature. This is accomplished by circulating the water into and out of the vulcanizing receptacle by means of a suitable force pump or the like, the water being admitted into the top of the vulcanizing receptacle through a perforated pipe which is arranged so as to cause the water to rain upon and be distributed uniformly over the rubber articles, and the water then being drawn from the bottom of the vulcanizing receptacle, either directly or through the medium of a suitable storage tank, and reintroduced at the top of said receptacle. In this way, the water is carried around and around in a closed circuit, although in such manner as to be sprayed continuously upon the articles without actually submerging them. At some suitable point in the circuit, the water is subjected to the required degree of heat to raise it to and maintain it at the desired vulcanizing temperature, and this may be conveniently effected by means of a steam pipe arranged within the body of water wherever it is stored or accumulates, the steam acting as it is admitted into the water not only to heat it up to vulcanizing temperature but to agitate it thoroughly and create a forced circulation such as is desired in maintaining a uniform temperature. Of course, there are various other ways in which the water may be heated, although the example given will be found to be very satisfactory.

In vulcanizing rubber tubes for vehicle tires, the uncured tubes are placed or built upon poles or mandrels, the opposite open ends of the tubes sealed to the mandrels, and the tubes while thus sealed upon the mandrels are placed in the vulcanizing receptacle and exposed directly to the action of the water spray. In such cases, it is proposed to subject the rubber tubes to a relatively high pressure, or at any rate a pressure in excess of the prevailing temperature pressure, in order to compact the tube stock and force it tightly against the poles or mandrels. By so doing, any irregularities in the uncured tubes are ironed out and any air trapped between them and the mandrels expelled or compressed to such an extent as to prevent the formation of blisters or other defects during vulcanization. This high pressure is created by admitting into the vulcanizing receptacle air or some other form of gas under pressure. While hot air under pressure might have a tendency to oxidize the tubes, this tendency is entirely overcome by the water which covers the tubes at all times. Of course, if desired, the high pressure medium could be an inert gas, such as carbon dioxide, but it is preferred to use air because it is very much less expensive. It is pointed out that after the tubes have become set, the high pressure referred to may be relieved and the vulcanization of the tubes completed under a lower pressure or even at the temperature pressure of the water. Indeed, the water spray may be discontinued and the vulcanizing operation carried on by the use of some other curing medium, such as steam. In the case of steam, this could be admitted into the vulcanizing receptacle from a separate source or by allowing the water used in the earlier stage of vulcanization to flash into steam.

The vulcanizing temperature will vary according to the nature of the rubber compound, although generally it will be somewhere between 275° F. and 310° F. The high pressure may be varied accordingly, although, generally speaking, a pressure of from 100 to 150 pounds will be found to be satisfactory.

In the accompanying drawings:

Fig. 1 is a sectional view of an apparatus designed in accordance with the principal features of my invention;

Fig. 2 is a top plan view of the apparatus in duplex form;

Fig. 3 is a front view of the duplex apparatus shown in Fig. 2;

Fig. 4 is a side elevation of a pole or mandrel with the rubber stock applied thereto preparatory vulcanization, parts being broken away and shown in section;

Fig. 5 is a transverse section taken through the pole and rubber stock, showing the manner in which the stock is ordinarily rolled upon the pole.

While as above stated, my invention may be used for the vulcanization of rubber articles in general, it will be herein described in connection with rubber tubes for vehicle tires. These tubes are composed of compounded gum stock without fabric reinforcement and are made up by rolling a sheet of gum stock A upon an open-ended cylindrical pole or mandrel B (see Fig. 4). It will be noted that, unless the gum stock is tightly squeezed or pressed against the mandrel, a small air pocket C will remain at the inner edge of the sheet and leave an objectionable seam at this point (Fig. 5). This is one of the reasons why the tubes during vulcanization are subjected to the high pressure referred to. However, in order to prevent the entrance of air or moisture at the opposite open ends of the tubes, such ends are sealed to the mandrels in some suitable way, as for example by means of the elastic rubber rings or bands D, or by means of the skiving bands or washers disclosed in my prior Patent No. 1,530,128, dated March 17, 1925. This is all that is necessary to prepare the tubes for vulcanization.

While other forms of apparatus may be employed, that shown in Figs. 1, 2 and 3 is recommended. The vulcanizing receptacle is designated 1 and is of a suitable size to receive a truck or vehicle carrying a load of the poles or mandrels B with the tubes placed and sealed thereon, (see dotted lines, Fig. 1). The vulcanizing receptacle is provided with a door 2, which may be opened to permit the loaded truck to be rolled into or out of the same before and after each vulcanizing operation. At the top of the vulcanizing receptacle, there is arranged one or more water inflow pipes 3, formed with apertures at the upper side, as shown at 4, to cause the water to strike against the upper wall of the receptacle and produce a rain spray which distributes the water uniformly upon all of the tubes. The inflow pipe 3 is connected to a water supply pipe 5, leading from the discharge side of a suitable pump or other forcing means 6 located outside of the vulcanizing receptacle. In the construction shown, the water supply pipe is carried into the vulcanizing receptacle and presents at the bottom thereof a horizontal coiled portion 7 connected to the inflow pipe by means of a branch portion 8 located at the closed end of the receptacle. The pump 6, at its suction side, is connected by means of a pipe 9 to a suitable storage tank 10, which latter is arranged in communication with the vulcanizing receptacle through the medium of a pipe or conduit 11. The pipe 11 is equipped with a suitable valve 12 to establish or shut off communication between the vulcanizing receptacle 1 and the storage tank 10, and a similar valve 13 is arranged between the pump 6 and the water supply pipe 5. The vulcanizing receptacle and the storage tank are provided with drain pipes 14 and 15 having controlling valves 16 and 17, respectively.

Leading into the bottom of the storage tank 10 is a steam pipe 18 having a control valve 19 and connected with a long steam inflow pipe 20 located at the bottom of the tank and having exit openings 21 extending through the sides thereof. If desired, there may also be placed within the storage tank a steam heating coil 22 supplied with steam from the pipe 18 under control of a valve 23 and leading off into a suitable condensation trap. A cold water supply-pipe 24 leads into the system at some suitable point, as for example into the supply pipe 5, a suitable valve 25 being provided to shut off or turn on the cold water.

At the top of the vulcanizing receptacle, there is arranged a header pipe 26 connected with the interior of the receptacle through a short pipe section 27. Leading off from the header pipe is a vent pipe 28 having a controlling valve 29, whereby the vulcanizing receptacle may be opened or closed to the atmosphere, as desired. At is rear end, the header pipe is provided with a safety or automatic relief valve 30 which may be set to blow off at a pressure slightly above that it is desired to create within the vulcanizer, which, as above stated, may be between 100 and 150 lbs. At its opposite end, the header pipe is connected to a compressed air supply pipe 31 and is provided with two valves 32 and 33, the former being an automatic pressure regulator to maintain the air pressure at the desired amount, and the latter a manually controlled valve by which the air pressure may be turned on or off, as desired.

The vulcanizing receptacle 1 may be and preferably is surrounded by a steam jacket 34 which will serve to maintain a uniform vulcanizing temperature within the receptacle.

Having in view the construction of my apparatus in accordance with the foregoing, its operation in carrying out my improved process is substantially as follows:

Having prepared a load of poles or mandrels with the rubber tubes thereon, and the tubes sealed to the mandrels at their opposite open ends, the truck carrying said poles is wheeled into the vulcanizing receptacle 1 and the door 2 closed. Assuming the water within the storage tank 10 to be heated to vulcanizing temperature or substantially so and the drain pipe valves 16 and 17 closed, as well as the cold water supply valve 25, the pump 6 is set into operation and the valves 12 and 13 opened and the water is then pumped from the storage tank and forced up through the supply pipe 5, its coiled portion 7 and branch portion 8, into the perforated inflow pipe 3 at the top of the vulcanizing receptacle. As the water issues from the perforations 4, its force is broken by impingement against the upper wall of the receptacle, and there is thus produced a water spray which rains down upon the load of tubes and covers them completely. Initially, or when the water is first admitted into the vulcanizing receptacle, the valve 29 in the vent pipe 28 may be turned to open the vulcanizing receptacle to the atmosphere. This operation will allow the tubes to be heated to a temperature of about 212° F., at which temperature the tubes will be softened sufficiently without becoming vulcanized to enable the rubber bands to close in upon the mandrels and effectively seal the tubes against the entrance of air or moisture. The operation need be carried on only for a brief period, say two or three minutes. Thereafter, the valve 29 is closed and the valve 33 opened to permit the high pressure air to enter the vulcanizing receptacle, it being noted, however, that the spraying of the tubes with water continues. By properly manipulating the valves 33, the air may be caused to build up any desired pressure within the vulcanizing receptacle, as limited only by the automatic valve 32 which maintains the pressure at the maximum, say anywhere from between 100 and 150 lbs. By varying the air pressure, the tubes undergoing vulcanization may be subjected to any desired pressure above the prevailing temperature pressure at any stage of the operation. If the pressure within the receptacle should exceed the maximum fixed, it will blow off through the safety valve 30. The force pump 6 is allowed to continue in operation until the articles are cured to the desired extent or until they acquire a permanent set. During all of this time, the water is continuously circulated into and out of the vulcanizing receptacle, being introduced at the top in the form of a spray through the perforated pipe 3, and drawn from the storage tank 10 as it flows into the tank from the vulcaniing receptacle. As the water is sprayed upon the tubes, it will, of course, act upon them all simultaneously and hence produce a uniform cure. The rate of cure may easily be regulated by varying the quantity of water sprayed upon the tubes or by varying the pressure within the vulcanizing receptacle, or both. Throughout the circulation, steam is admitted into the water from the steam inflow pipe 20, the steam being condensed into water and acting not only to heat up the water to the vulcanizing temperature, but to agitate and maintain it uniformly at that temperature at all times. The heating of the water is supplemented, of course, by the steam coil 22 also arranged within the storage tank. In this connection, it is pointed out that the pipe coil 7, included in the water supply connections, also aids in keeping the water at a uniform vulcaniing temperature, the heated water in passing through the coil giving up a portion of its heat to the water which accumulates at the bottom of the vulcanizing receptacle after being sprayed upon the tubes undergoing vulcanization.

It will thus be seen that the rubber tubes are vulcanized under the action of a water spray which plays continuously upon them and which prevents any danger of their oxidation by the air used in creating the high pressure within the receptacle. As will be apparent, the quantity of water employed is or need be very small, and only enough to permit the continuous spraying of the articles in the manner described. As a result, the heat energy required in raising the water to and maintaining it at the desired vulcanizing temperature is substantially the amount only used up during vulcanization.

In carrying out my process, a small amount of soapstone may be placed in the vulcanizing receptacle or upon the tubes themselves before the water spray is started. This soapstone will then become thoroughly mixed with the water as it is circulated round and round through the vulcanizing receptacle and storage tank, such mixing of the soapstone and water being aided by the injection of steam into the water as it passes through the storage tank. The soapstone will thus be thoroughly distributed throughout the body of water and will be applied to all of the tubes in a uniform manner. As a matter of fact, the tubes will become impregnated with the soapstone, which will therefore prevent them from sticking together when packed in boxes for shipment and which will give them a nice fluffy appearance when they are removed for inspection by a customer. Moreover, the soapstone when so impregnated into the tubes renders it easier to strip them from the poles or mandrels after vulcanization.

After the tubes have become set under the combined action of the water spray and the high air pressure, the latter may be discontinued and the vulcanization completed by the use of the water spray at temperature pressure only. As a further alternative, the water spray and high air pressure may both be discontinued, and the final vulcanization effected in some other curing medium, either in the vulcanizing receptacle 1, or some other suitable vulcanizing receptacle. In the present instance, it is proposed to finish the curing of the tubes in steam generated by the water used for spraying. This may be done by lowering the pressure within the receptacle 1 to the proper vulcanizing temperature (involving the closing of the compressed air valve 33 and the temporary opening of the vent valve 29) and by admitting enough water into the receptacle to fill it with steam at the desired temperature. Thereafter, the steam jacket 34 will act to maintain a uniform temperature within the vulcanizing receptacle, so that the operation of the force pump 6 may be discontinued and the valves 12 and 13 closed, if desired. Of course, if need be (and if the heating jacket 34 were omitted), the storage tank could be left in communication with the vulcanizing receptacle to maintain the required vulcanizing temperature.

Upon completion of the vulcanization of the rubber tubes in the manner above described, it may be desirable to cool them off before removing them from the vulcanizing receptacle. For this purpose, it is necessary only to open the valve 25 and allow cold water from the supply pipe 24 to be sprayed down over the tubes for a brief period. The cold water may then be drawn from the receptacle through the pipe 14 by opening the valve 16. If the vulcanizing receptacle is filled with steam only at the time, compressed air may be admitted into the receptacle by opening the valve 33 to build up pressure enough to prevent the creation of a vacuum. The cooling of the tubes may also be effected by spraying them with hot water drawn from the storage tank 10, although in such case the vulcanizing receptacle should be opened to the atmosphere, by operating the valve 29, to allow the temperature of the water to drop to 210° F.

In Figs. 2 and 3, I have shown my apparatus in duplex form, that is to say, as comprising two separate vulcanizing receptacles 1 and 1' in association with a single storage tank 10 and a single force pump 6. As the two vulcanizing receptacles are of the same construction and their connections with the storage tank practically identical, it seems unnecessary to enlarge upon the detail description given, except to say that the corresponding parts are denoted by the same reference numerals, one set with and the other without the prime designation. In the case of this duplex apparatus, it will be apparent that either one of the two vulcanizing receptacles may be used to the exclusion of the other, or both used simultaneously, by operating the controlling valves in the proper manner. While only two such vulcanizing receptacles are herein shown, it is obvious that a greater number could be employed if desired, it being necessary only to provide a storage tank and force pump of sufficient capacity to circulate the water through all of the vulcanizing receptacles at the same time if and when that is desired. Of course, if it is intended to use only one vulcanizer at a time, there need be no change in that connection.

Many variations and modifications in the apparatus and process above described will readily suggest themselves to those skilled in the art without departing from the spirit of my invention, and it should therefore be understood that the invention is not limited to any particular apparatus of to any particular mode of procedure, except in so far as such limitations are set forth in the appended claims.

The word spray or spraying employed in the specification and claims is used in a broad and general sense and is not intended to refer to any particular form of spray or to any particular mode of producing a spray unless otherwise indicated.

Having thus described my invention, what I claim and desire to secure by Letters Patent of the United States, is:

1. The method of vulcanizing rubber articles, which consists in subjecting the articles to be vulcanized to a continuous spray of water or a similar liquid heated to the desired vulcanizing temperature.

2. The method of vulcanizing rubber articles, which consists in subjecting the articles to be vulcanized to a continuous spray of water or a similar liquid heated to the desired vulcanizing temperature, and maintaining the articles under a pressure in excess of the vulcanizing temperature pressure during the setting period.

3. The method of vulcanizing rubber articles, which consists in placing the articles to be vulcanized in a suitable receptacle, admitting into said receptacle, in the form of a spray, water or a similar liquid heated to the desired vulcanizing temperature, allowing the water after spraying to collect in a body below the articles, heating the water sufficiently to maintain it at vulcanizing temperature, and forcing the water back into the vulcanizing receptacle over and over again in the form of a spray until the articles have become set.

4. The method of vulcanizing rubber articles, which consists in placing the articles to be vulcanized in a suitable receptacle, admitting into said receptacle, in the form of a spray, water or a similar liquid heated to the desired vulcanizing temperature, allowing the water after spraying to collect in a body below the articles, heating the water sufficiently to maintain it at the vulcanizing temperature, forcing the water back into the vulcanizing receptacle over and over again in the form of a spray until the articles have become set, and during the setting period maintaining within the vulcanizing receptacle a pressure in excess of the vulcanizing temperature pressure.

5. The method of vulcanizing rubber articles, which consists in providing a closed system containing water or a similar liquid heated to the desired vulcanizing temperature and including a suitable receptacle to contain the articles to be vulcanized, circulating the water around and around through said system, supplying to the water in its circulation sufficient heat to maintain it at the desired vulcanizing temperature, and causing the water as it passes through the vulcanizing receptacle to be sprayed onto the articles undergoing vulcanization.

6. The method of vulcanizing rubber articles, which consists in providing a closed system containing water or a similar liquid heated to the desired vulcanizing temperature and including a suitable receptacle to contain the articles to be vulcanized, circulating the water around and around through said system, supplying to the water in its circulation sufficient heat to maintain it at the desired vulcanizing temperature, causing the water as it passes through the vulcanizing receptacle to be sprayed onto the articles undergoing vulcanization, and during the setting period maintaining within the vulcanizing receptacle a pressure in excess of the vulcanizing temperature pressure.

7. The method of vulcanizing rubber articles, which consists in subjecting the articles to be vulcanized to a continuous spray of water or a similar liquid heated to the desired vulcanizing temperature, and controlling the quantity of water sprayed upon the articles so as to regulate the rate of heating of the articles before they acquire the vulcanizing heat.

8. The method of vulcanizing rubber articles, which consists in subjecting the articles to be vulcanized to a continuous spray of water or a similar liquid heated to the desired vulcanizing temperature, controlling the quantity of water sprayed upon the articles so as to regulate the rate of heating of the articles before they acquire the vulcanizing heat, and maintaining the articles under a pressure in excess of the prevailing temperature pressure.

9. The method of vulcanizing rubber articles, which consists in subjecting the articles to be vulcanized to a continuous spray of water or a similar liquid heated to the desired vulcanizing temperature, maintaining the articles under a pressure in excess of the prevailing temperature pressure, and varying said excess pressure independently of the temperature pressure; whereby the articles may be subjected to any desired pressure above the temperature pressure at any stage of vulcanization.

10. The method of vulcanizing rubber articles, which consists in preliminarily softening the articles under a low temperature heat, and then causing the articles to become set under the action of a continuous spray of water or a similar liquid heated to the desired vulcanizing temperature.

11. The method of vulcanizing rubber articles, which consists in preliminarily softening the articles under a low temperature heat, then causing the articles to become set under the action of a continuous spray of water or a similar liquid heated to the desired vulcanizing temperature, and maintaining the articles under a pressure in excess of the vulcanizing temperature during the setting period.

12. The method of vulcanizing rubber articles, which consists in placing the articles to be vulcanized in a suitable receptacle, spraying them with water or a similar liquid heated to the desired vulcanizing temperature while the receptacle is vented to the atmosphere so as to soften the articles without vulcanizing them, and thereafter spraying the heated water onto the articles while the vulcanizing receptacle is closed to the atmosphere.

13. The method of vulcanizing rubber articles, which consists in placing the articles to be vulcanized in a suitable receptacle, spraying them with water or a similar liquid heated to the desired vulcanizing temperature while the receptacle is vented to the atmosphere so as to soften the articles without vulcanizing them, thereafter spraying the heated water onto the articles while the vulcanizing receptacle is closed to the atmosphere, and during the setting period maintaining the articles under pressure in excess of the vulcanizing temperature pressure.

14. The herein described method, which consists in vulcanizing rubber articles by subjecting them while in a receptacle closed to the atmosphere to a continuous spray of water or a similar liquid heated to the desired vulcanizing temperature, and after vulcanization spraying the articles with the heated water while the vulcanizing receptacle is open to the atmosphere.

15. The method of vulcanizing rubber articles, which consists in subjecting the articles to be vulcanized to a continuous spray of water or a similar liquid heated to the desired vulcanizing temperature, and after the articles become set discontinuing the water spray and completing the vulcanization by heating the articles in a different manner.

16. The method of vulcanizing rubber articles, which consists in subjecting the articles to be vulcanized to a continuous spray of water or a similar liquid heated to the desired vulcanizing temperature, and after the articles have become set discontinuing the water spray and completing the vulcanization of the articles in steam at the proper temperature.

17. The method of vulcanizing rubber articles, which consists in subjecting the articles to be vulcanized to a continuous spray of water or a similar liquid heated to the desired vulcanizing temperature, maintaining the articles under pressure in excess of the vulcanizing temperature pressure until they become set, and thereafter completing the vulcanization of the articles at a lower pressure.

18. The method of vulcanizing rubber articles, which consists in subjecting the articles to be vulcanized to a continuous spray of water or a similar liquid heated to the desired vulcanizing temperature, maintaining the articles under pressure in excess of the vulcanizing temperature pressure until they become set, and thereafter relieving the pressure and completing the vulcanization of the articles in steam at the proper temperature.

19. The method of vulcanizing rubber articles, which consists in providing a closed system containing water or a similar liquid mixed with soapstone and heated to the desired vulcanizing temperature and including a suitable receptacle to contain the articles to be vulcanized, circulating the water around and around through said system and effecting the thorough distribution of the soapstone throughout the whole body of water, and causing the water as it passes through the vulcanizing receptacle to be sprayed onto the articles to effect their vulcanization and to impregnate them with soapstone.

20. A vulcanizing apparatus including, in combination, a vulcanizing receptacle adapted to contain the articles to be vulcanized, a storage tank arranged in communication with the vulcanizing receptacle and containing a relatively small body of water, means for circulating the water around and around through said vulcanizing receptacle and storage tank, means for heating the water in its circulation, and means for causing the water as it enters the vulcanizing receptacle to be sprayed onto the articles undergoing vulcanization.

21. A vulcanizing apparatus including, in combination, a vulcanizing receptacle adapted to contain the articles to be vulcanized, a storage tank arranged in communication with the vulcanizing receptacle and containing a relatively small body of water, means for circulating the water around and around through said vulcanizing receptacle and storage tank, means for heating the water in its circulation, means for causing the water as it enters the vulcanizing receptacle to be sprayed onto the articles undergoing vulcanization, and means for creating any desired pressure within the vulcanizing receptacle during the action of the water spray.

22. A vulcanizing apparatus including, in combination, a plurality of vulcanizing receptacles adapted to contain the articles to be vulcanized, a common storage tank, means whereby said storage tank may be placed in communication with either one or both of said vulcanizing receptacles as desired, means for circulating the water around and around through said vulcanizing receptacle or receptacles and the storage tank, means for heating the water in its circulation, and means for causing the water as it enters the vulcanizing receptacle or receptacles to be sprayed onto the articles undergoing vulcanization.

23. A vulcanizing apparatus including, in combination, a vulcanizing receptacle adapted to contain the articles to be vulcanized, a storage tank arranged in communication with the vulcanizing receptacle and containing a relatively small body of water, a force pump for circulating the water around and around through said vulcanizing receptacle and storage tank, a steam pipe located in the storage tank and formed to discharge steam directly into the body of water, and means for causing the water as it enters the vulcanizing receptacle to be sprayed onto the articles undergoing vulcanization.

24. The method of vulcanizing rubber articles which consists in placing the articles to be vulcanized in a suitable receptacle, admitting water heated to the desired vulcanizing temperature into said receptacle in such manner as to distribute the water onto all of the articles simultaneously or substantially so so as to ensure the uniform heating of the articles, allowing the water after being distributed onto the articles to collect in a body below and free and clear of the articles, heating the water sufficiently to maintain it a vulcanizing temperature, and forcing the water back into the vulcanizing receptacle over and over again until the articles have become set.

25. The method of vulcanizing rubber tubes for vehicle tires, which consists in placing the tubes to be vulcanized upon poles or mandrels, sealing the open ends of the tubes to the mandrels, and subjecting the tubes to direct contact with a continuous spray of water or a similar liquid heated to the desired vulcanizing temperature.

26. The method of vulcanizing rubber tubes for vehicle tires, which consists in placing the tubes to be vulcanized upon poles or mandrels, sealing the open ends of the tubes to the mandrels, and subjecting the tubes to direct contact with a continuous spray of water or a similar liquid heated to the desired vulcanizing temperature, and during the setting period maintaining the tubes under a pressure in excess of the vulcanizing temperature pressure.

27. The method of vulcanizing rubber tubes for vehicle tires, which consists in placing the tubes to be vulcanized upon poles or mandrels, sealing the open ends of the tubes to the mandrels, preliminarily softening the tubes under a low temperature heat, and then causing the tubes to become set by direct contact with a continuous spray of water or a similar liquid heated to the desired vulcanizing temperature.

In testimony whereof, I have affixed my signature hereto.

LAURITS A. LAURSEN.